US011281201B2

(12) United States Patent
Williams (10) Patent No.: US 11,281,201 B2
(45) Date of Patent: Mar. 22, 2022

(54) AIR CONDITIONER AND METHODS OF OPERATION HAVING A LEARNING EVENT

(71) Applicant: Haier US Appliance Solutions, Inc., Wilmington, DE (US)

(72) Inventor: Craig Benjamin Williams, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 334 days.

(21) Appl. No.: 16/583,777

(22) Filed: Sep. 26, 2019

(65) Prior Publication Data

US 2021/0096555 A1 Apr. 1, 2021

(51) Int. Cl.
*G05B 23/02* (2006.01)
*F24F 1/0007* (2019.01)

(52) U.S. Cl.
CPC .......... *G05B 23/021* (2013.01); *F24F 1/0007* (2013.01); *G05B 23/0229* (2013.01)

(58) Field of Classification Search
None
See application file for complete search history.

(56) References Cited

U.S. PATENT DOCUMENTS

| 8,141,791 B2 | 3/2012 | Rosen |
| 10,088,185 B2 | 10/2018 | Taylor et al. |
| 2019/0121337 A1 | 4/2019 | Cohen et al. |

OTHER PUBLICATIONS

Jaehyeok Heo et al., "Self Training of a Fault-Free Model for Residential Air Conditioner Fault Detection and Diagnostics", NIST Technical Note 1881, May 2015 (Year: 2015).*

\* cited by examiner

Primary Examiner — Carlos R Ortiz Rodriguez
(74) Attorney, Agent, or Firm — Dority & Manning, P.A.

(57) ABSTRACT

An air conditioner, as provided herein, may include a cabinet, an outdoor heat exchanger, an indoor heat exchanger, a compressor, an internal temperature sensor, and a controller. The controller may be configured to initiate a conditioning operation. The conditioning operation may include detecting a learning condition at the air conditioner, identifying a first operating mode, and initiating a learning event at the first operating mode. The conditioning operation may further include measuring performance during the learning event, recording a baseline variable based on the measured performance during the learning event, and measuring performance at the first operating mode. The conditioning operation may still further include recording an operational variable based on the measured performance at the first operating mode, comparing the operational variable of the first operating mode to the baseline variable of the first operating mode, determining a fault state based on the comparison, and recording the fault state.

18 Claims, 7 Drawing Sheets

AIR CONDITIONER AND METHODS OF OPERATION HAVING A LEARNING EVENT

FIELD OF THE INVENTION

The present subject matter relates generally to single-package air conditioner units, including methods of operating such units in a manner that accounts for the environment in which a unit is installed.

BACKGROUND OF THE INVENTION

Air conditioner units are conventionally utilized to adjust the temperature within structures such as dwellings and office buildings. In particular, one-unit type or single-package air conditioner units, such as window units, single-package vertical units (SPVU), vertical packaged air conditioners (VPAC), or package terminal air conditioners (PTAC) may be utilized to adjust the temperature in, for example, a single room or group of rooms of a structure. Such units are especially common in hotels, rental apartments, and assisted-living facilities in which a large number of occupants live within the same building.

A typical one-unit type air conditioner or air conditioning appliance includes an indoor portion and an outdoor portion. The indoor portion generally communicates (e.g., exchanges air) with the area within a building, and the outdoor portion generally communicates (e.g., exchanges air) with the area outside a building. Accordingly, the air conditioner unit generally extends through, for example, a wall of the structure. Generally, a fan may be operable to rotate to motivate air through the indoor portion. Another fan may be operable to rotate to motivate air through the outdoor portion. A sealed cooling system including a compressor is generally housed within the air conditioner unit to treat (e.g., cool or heat) air as it is circulated through, for example, the indoor portion of the air conditioner unit. One or more control boards are typically provided to direct the operation of various elements of the particular air conditioner unit.

One of the challenges that exist, especially for single-package air conditioner units, is identifying if or when an air conditioner unit is operating outside its intended or desired state. In other words, it can be difficult to know if an air conditioner unit is in need of maintenance, is being used in an inappropriately-sized room, or is otherwise performing in a manner that indicates an error with the unit. This may be due, in part, to the large variety of buildings, rooms, geographic locations, etc. in which a single type (e.g., model) of air conditioner may be installed. Changes in what may be considered typical or desirable performance may further change with the temperate seasons (i.e., summer, autumn, winter, spring). Even moving a specific air conditioner unit from one room to another in the same building may alter the typical or desirable performance of the unit. Further complicating matters, different users may have wildly different preferences for what temperature a room should be maintained at. Thus, the demands on a specific air conditioner unit may vary as the room's occupants change. In such cases, atypical performance or operation may be even more difficult to identify.

Accordingly, it may be useful to provide an air conditioner unit addressing one or more of the above-identified issues. In particular, it may be advantageous to provide an air conditioner unit or method of operation that can adapt to the conditions in which a unit is installed and identify atypical or undesirable performance in a wide variety of environments.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a single-package air conditioner is provided. The method may include detecting a learning condition at the air conditioner, identifying a first operating mode of the air conditioner, and initiating a learning event at the first operating mode in response to detecting the learning condition. The method may further include measuring performance of the air conditioner during the learning event of the first operating mode; recording, within the air conditioner, a baseline variable of the first operating mode based on the measured performance during the learning event; and measuring performance of the air conditioner at the first operating mode following the learning event. The method may still further include recording, within the air conditioner, an operational variable of the first operating mode based on the measured performance at the first operating mode following the learning event; comparing the operational variable of the first operating mode to the baseline variable of the first operating mode; determining a fault state based on comparing the operational variable of the first operating mode to the baseline variable of the second operating mode; and recording, within the air conditioner, the fault state.

In another exemplary aspect of the present disclosure, an air conditioner is provided. The air conditioner may include a cabinet, an outdoor heat exchanger, an indoor heat exchanger, a compressor, an internal temperature sensor, and a controller. The cabinet may define an outdoor portion and an indoor portion. The outdoor heat exchanger may be disposed in the outdoor portion. The indoor heat exchanger may be disposed in the indoor portion. The compressor may be in fluid communication with the outdoor heat exchanger and the indoor heat exchanger to circulate a refrigerant between the outdoor heat exchanger and the indoor heat exchanger. The internal temperature sensor may be attached to the cabinet. The controller may be in operative communication with the compressor and the internal temperature sensor. The controller may be configured to initiate a conditioning operation. The conditioning operation may include detecting a learning condition at the air conditioner, identifying a first operating mode of the air conditioner, and initiating a learning event at the first operating mode in response to detecting the learning condition. The conditioning operation may further include measuring performance of the air conditioner during the learning event of the first operating mode; recording, within the air conditioner, a baseline variable of the first operating mode based on the measured performance during the learning event; and measuring performance of the air conditioner at the first operating mode following the learning event. The conditioning operation may still further include recording, within the air conditioner, an operational variable of the first operating mode based on the measured performance at the first operating mode following the learning event; comparing the operational variable of the first operating mode to the baseline variable of the first operating mode; determining a fault state based on comparing the operational variable of the first operating mode to the baseline variable of the second operating mode; and recording, within the air conditioner, the fault state.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The phrase "in one embodiment," does not necessarily refer to the same embodiment, although it may. The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Referring now to the figures, in FIGS. 1 through 5, an air conditioner 10 according to various exemplary embodiments is provided. The air conditioner 10 is generally a one-unit type air conditioner, also conventionally referred to as a room air conditioner or package terminal air conditioner unit (PTAC). The air conditioner 10 includes an indoor portion 12 and an outdoor portion 14, and defines a vertical direction V, a lateral direction L, and a transverse direction T. Each direction V, L, T is perpendicular to each other, such that an orthogonal coordinate system is generally defined.

Although described in the context of a PTAC, an air conditioner unit as disclosed herein may be provided as a window unit, single-package vertical unit (SPVU), vertical packaged air conditioner (VPAC), or any other suitable single-package air conditioner. The air conditioner 10 is intended only as an exemplary unit and does not otherwise limit the scope of the present disclosure. Thus, it is understood that the present disclosure may be equally applicable to other types of air conditioner units.

Generally, a cabinet 20 of the air conditioner 10 contains various other components of the air conditioner 10. Cabinet 20 may include, for example, a rear grill 22 and a room front 24 that may be spaced apart along the transverse direction T by a wall sleeve 26. The rear grill 22 may be part of the outdoor portion 14, while the room front 24 is part of the indoor portion 12. Components of the outdoor portion 14, such as an outdoor heat exchanger 30, outdoor fan 33 (FIG. 5), and compressor 32 may be housed within the wall sleeve 26. A casing 34 may additionally enclose the outdoor fan 33, as shown.

Figure 2:
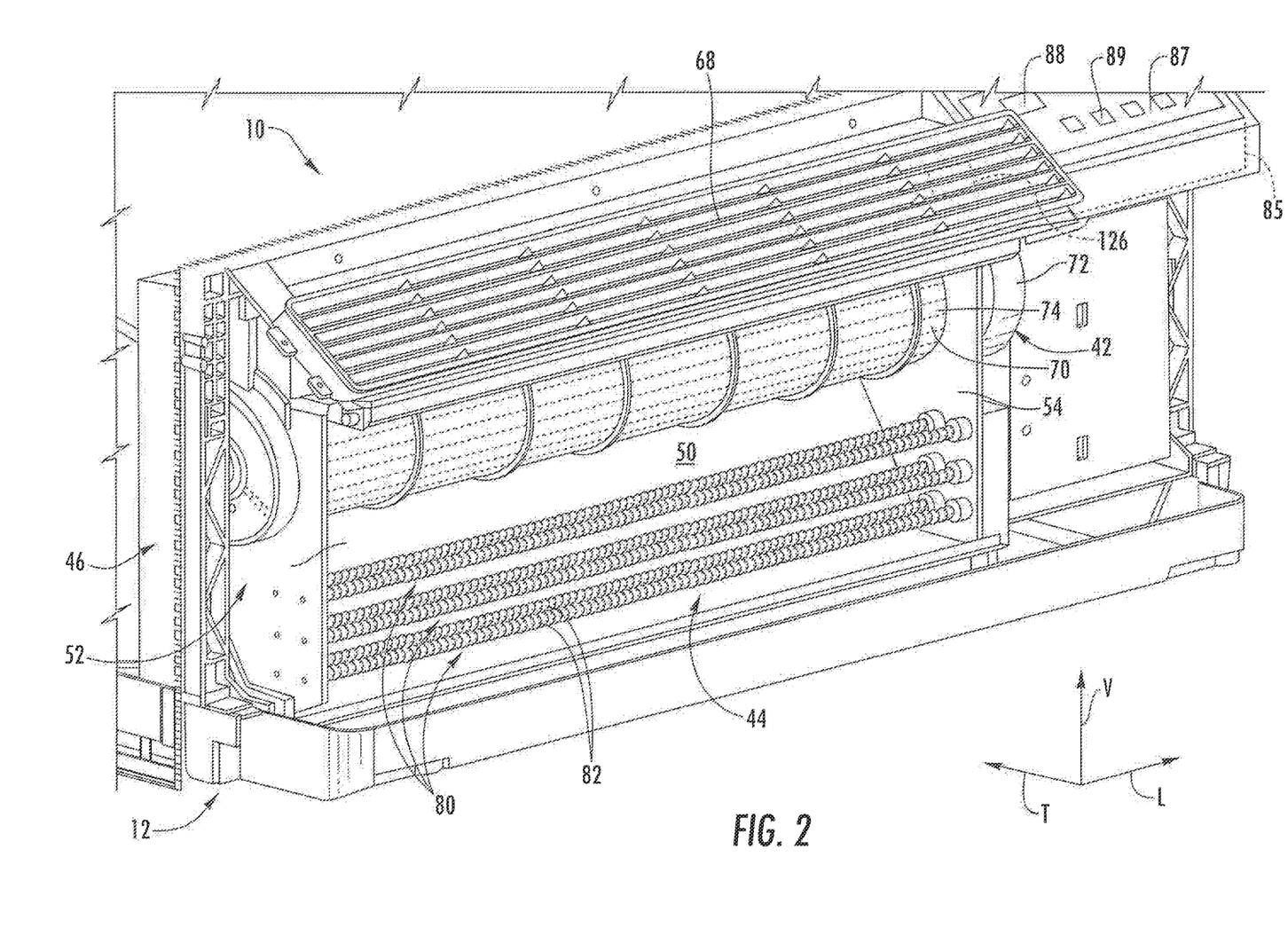
FIG. 2 is a perspective view of components of an indoor portion of an air conditioner unit in accordance with exemplary embodiments of the present disclosure.

Referring now also to FIG. 2, indoor portion 12 may include, for example, an indoor heat exchanger 40, a blower fan 42, and a heating unit 44. These components may, for example, be housed behind the room front 24. Additionally, a bulkhead 46 may generally support or house various other components or portions thereof of the indoor portion 12, such as the blower fan 42 and the heating unit 44. Bulkhead 46 may generally separate and define the indoor portion 12 and outdoor portion 14.

Outdoor and indoor heat exchangers 30, 40 may be components of a thermodynamic assembly (i.e., sealed system), which may be operated as a refrigeration assembly (and thus perform a refrigeration cycle in a cooling mode) and, in the case of the heat pump unit embodiment, a heat pump (and thus perform a heat pump cycle in a heating mode). Thus, as is understood, exemplary heat pump unit embodiments may be selectively operated perform a refrigeration cycle at certain instances (e.g., while in a cooling mode) and a heat pump cycle at other instances (e.g., while in a heating mode). By contrast, exemplary A/C exclusive unit embodiments may be unable to perform a heat pump cycle (e.g., while in the heating mode), but still perform a refrigeration cycle (e.g., while in a cooling mode).

Figure 5:
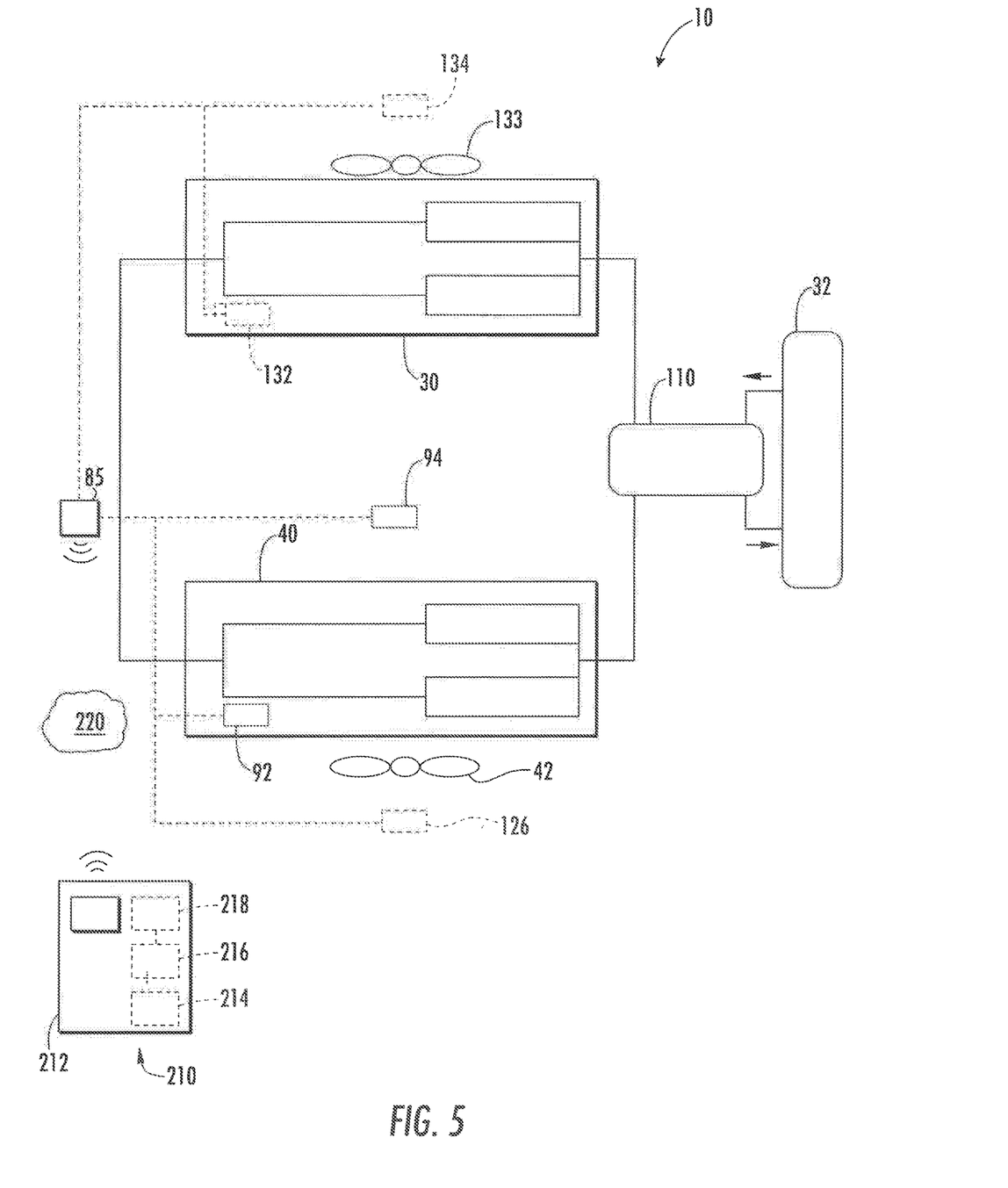
FIG. 5 provides a schematic view of an air conditioner unit according to exemplary embodiments of the present disclosure.

In optional embodiments, such as exemplary heat pump unit embodiments, the sealed system includes a reversible refrigerant valve 110 (FIG. 5). Reversible refrigerant valve 110 selectively directs compressed refrigerant from compressor 32 to either indoor heat exchanger 40 or outdoor heat exchanger 30. For example, in a cooling mode, reversible refrigerant valve 110 is arranged or configured to direct compressed refrigerant from compressor 32 to outdoor heat exchanger 30. Conversely, in a heating mode, reversible refrigerant valve 110 is arranged or configured to direct compressed refrigerant from compressor 32 to indoor heat exchanger 40. Thus, reversible refrigerant valve 110 permits the sealed system to adjust between the heating mode and the cooling mode, as will be understood by those skilled in the art.

The sealed system or assembly may, for example, further include compressor 32 and an expansion valve, both of which may be in fluid communication with the heat exchangers 30, 40 to flow refrigerant therethrough, as is generally understood. Optionally, the compressor 32 may be a variable speed compressor or, alternatively, a single speed compressor. When the assembly is operating in a cooling mode, and thus performs a refrigeration cycle, the indoor heat exchanger 40 acts as an evaporator and the outdoor heat exchanger 30 acts as a condenser. In heat pump unit embodiments, when the assembly is operating in a heating mode, and thus performs a heat pump cycle, the indoor heat exchanger 40 acts as a condenser and the outdoor heat exchanger 30 acts as an evaporator. The outdoor and indoor heat exchangers 30, 40 may each include coils 31, 41, as illustrated, through which a refrigerant may flow for heat exchange purposes, as is generally understood. For instance, and as will be understood, in response to an input temperature setting, compressor 32 may activate for a cycle (e.g., cooling cycle or heating cycle) until the input temperature setting (or hysteresis thereof) is detected within the corresponding room.

Bulkhead 46 may include various peripheral surfaces that define an interior 50 thereof. For example, and additionally referring to FIG. 3, bulkhead 46 may include a first sidewall 52 and a second sidewall 54 which are spaced apart from each other along the lateral direction L. A rear wall 56 may extend laterally between the first sidewall 52 and second sidewall 54.

Figure 3:
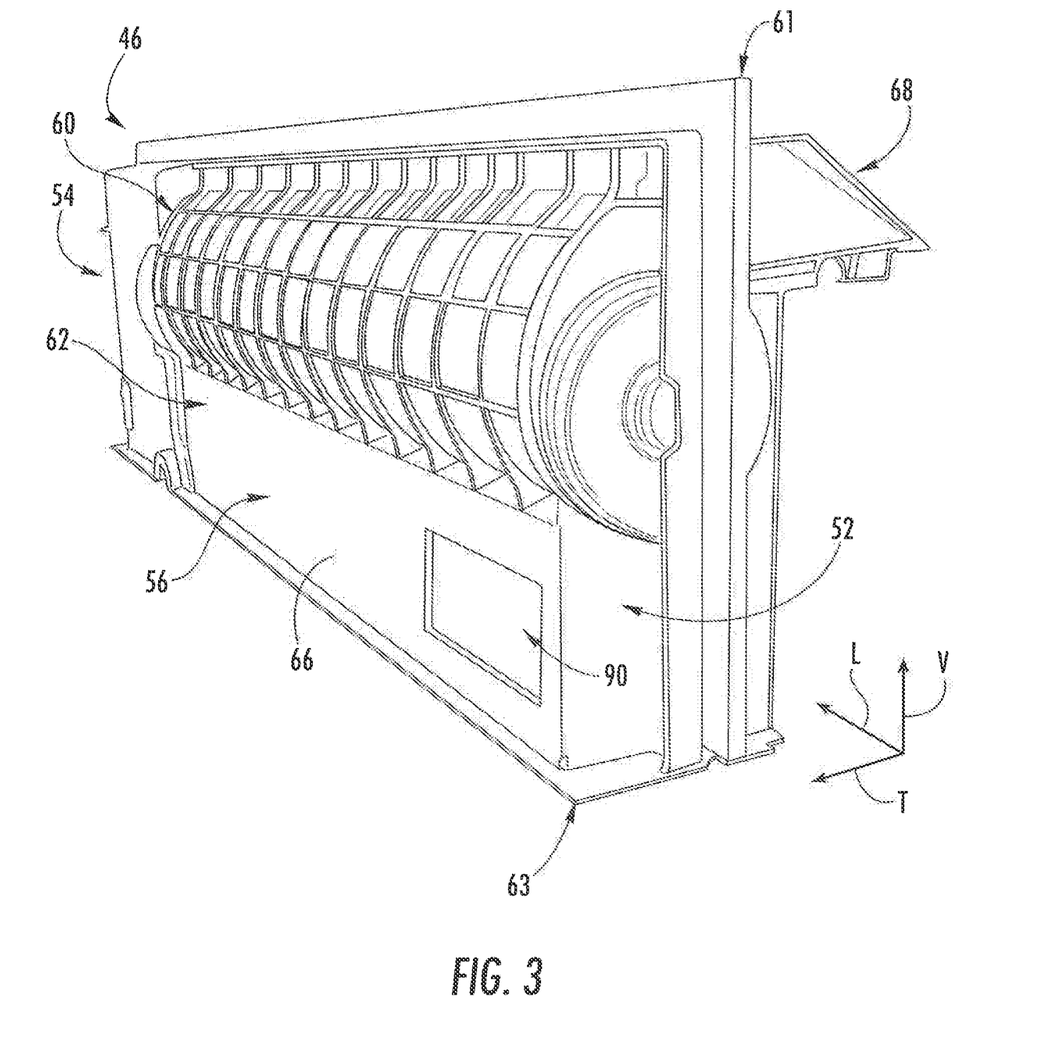
FIG. 3 is a rear perspective view of a bulkhead assembly in accordance with exemplary embodiments of the present disclosure.

The rear wall 56 may, for example, include an upper portion 60 and a lower portion 62. Upper portion 60 may for example have a generally curvilinear cross-sectional shape, and may accommodate a portion of the blower fan 42 when blower fan 42 is housed within the interior 50. Lower portion 62 may have a generally linear cross-sectional shape, and may be positioned below upper portion 60 along the vertical direction V. Rear wall 56 may further include an indoor facing surface 64 and an opposing outdoor facing surface. The indoor facing surface 64 may face the interior 50 and indoor portion 12, and the outdoor facing surface 66 may face the outdoor portion 14.

Bulkhead 46 may additionally extend between a top end 61 and a bottom end 63 along vertical axis V. Upper portion 60 may, for example, include top end 61, while lower portion 62 may, for example, include bottom end 63.

Bulkhead 46 may additionally include, for example, an air diverter 68, which may extend between the sidewalls 52, 54 along the lateral direction L and through which air may flow.

In exemplary embodiments, blower fan 42 may be a tangential fan. Alternatively, however, any suitable fan type may be utilized. Blower fan 42 may include a blade assembly 70 and a motor 72. The blade assembly 70, which may include one or more blades disposed within a fan housing 74, may be disposed at least partially within the interior 50 of the bulkhead 46, such as within the upper portion 60. As shown, blade assembly 70 may for example extend along the lateral direction L between the first sidewall 52 and the second sidewall 54. The motor 72 may be connected to the blade assembly 70, such as through the fan housing 74 to the blades via a shaft. Operation of the motor 72 may rotate the blades, thus generally operating the blower fan 42 (e.g., in a cooling mode, heating mode, or fan-only mode). Further, in exemplary embodiments, motor 72 may be disposed exterior to the bulkhead 46. Accordingly, the shaft may for example extend through one of the sidewalls 52, 54 to connect the motor 72 and blade assembly 70.

In exemplary embodiments, heating unit 44 includes one or more heater banks 80. Each heater bank 80 may be operated as desired to produce heat. In some embodiments, three heater banks 80 may be utilized, as shown. Alternatively, however, any suitable number of heater banks 80 may be utilized. Each heater bank 80 may further include at least one heater coil or coil pass 82, such as in exemplary embodiments two heater coils or coil passes 82. Alternatively, other suitable heating elements may be utilized. As is understood, each heater coil pass 82 may be provided as a resistive heating element configured to generate heat in response to resistance to an electrical current flowed therethrough. For instance, and as will be understood, in response to an input temperature setting, at least a portion heater bank 82 may activate as an electrical current is flowed therethrough for a heating cycle until the input temperature setting (or hysteresis thereof) is detected within the corresponding room.

The operation of air conditioner 10, including compressor 32 (and thus the sealed system generally) blower fan 42, fan 33, heating unit 44, and other suitable components, may be controlled by a control board or controller 85. Controller 85 may be in communication (via for example a suitable wired or wireless connection) to such components of the air conditioner 10. By way of example, the controller 85 may include a memory and one or more processing devices such as microprocessors, CPUs or the like, such as general or special purpose microprocessors operable to execute programming instructions or micro-control code associated with operation of air conditioner 10. The memory may be a separate component from the processor or may be included onboard within the processor. The memory may represent random access memory such as DRAM, or read only memory such as ROM or FLASH. Generally, the processor executes programming instructions stored in memory.

Air conditioner 10 may additionally include a control panel 87 and one or more user inputs 89, which may be included in control panel 87. The user inputs 89 may be in communication with the controller 85. A user of the air conditioner 10 may interact with the user inputs 89 to operate the air conditioner 10, and user commands may be transmitted between the user inputs 89 and controller 85 to facilitate operation of the air conditioner 10 based on such user commands (e.g., to specify a desired temperature, cooling mode, heating mode, fan-only mode, idle mode, date/time, service event, etc.). A display 88 may additionally be provided in the control panel 87 and may be in communication with the controller 85. Display 88 may, for example, be a touchscreen or other text-readable display screen, or alternatively may simply be a light that can be activated and deactivated as required to provide an indication of, for example, an event, setting, or mode for the air conditioner 10.

Figure 1:
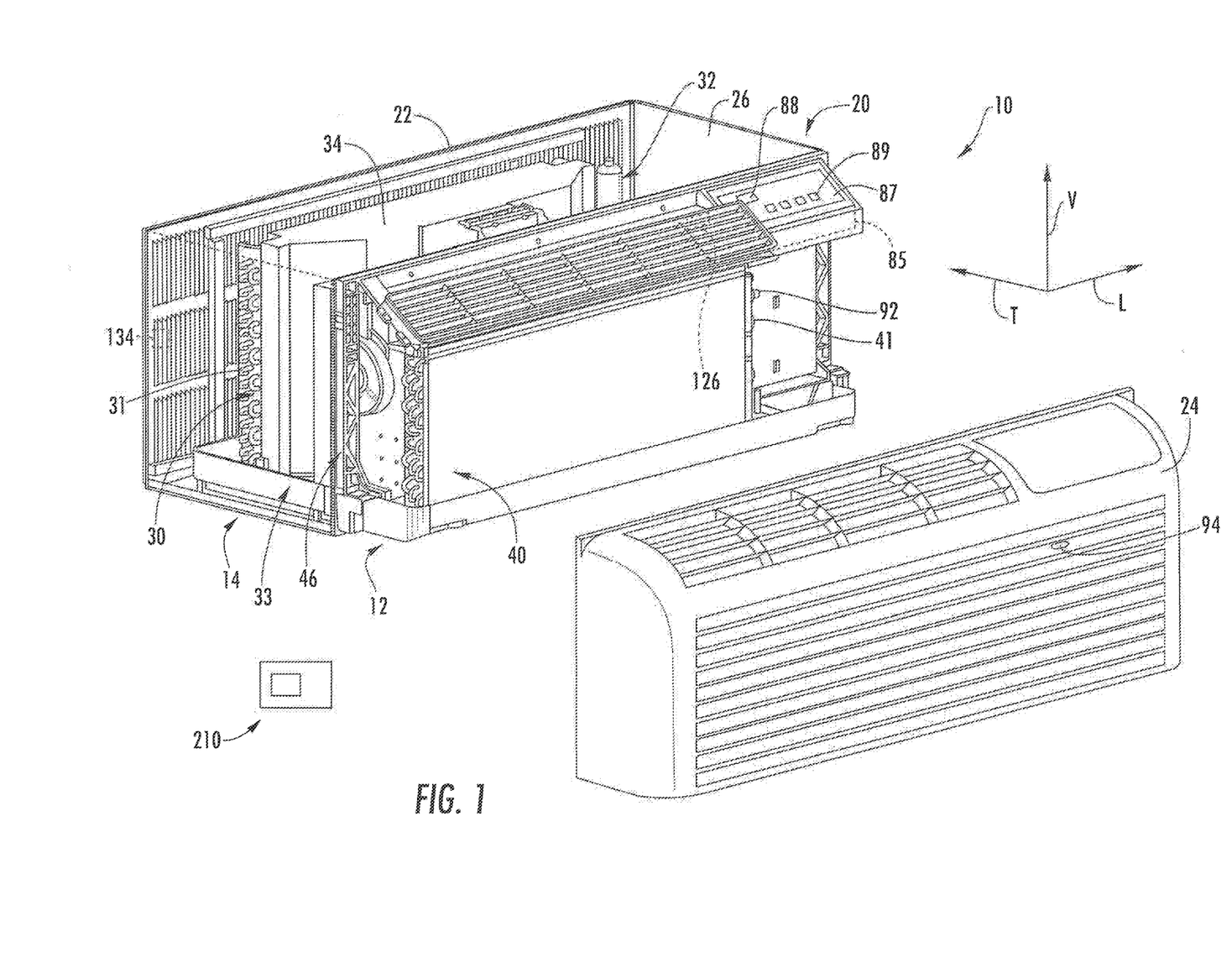
FIG. 1 provides a perspective view of an air conditioner unit, with a room front exploded from a remainder of the air conditioner unit for illustrative purposes, in accordance with exemplary embodiments of the present disclosure.
Figure 4:
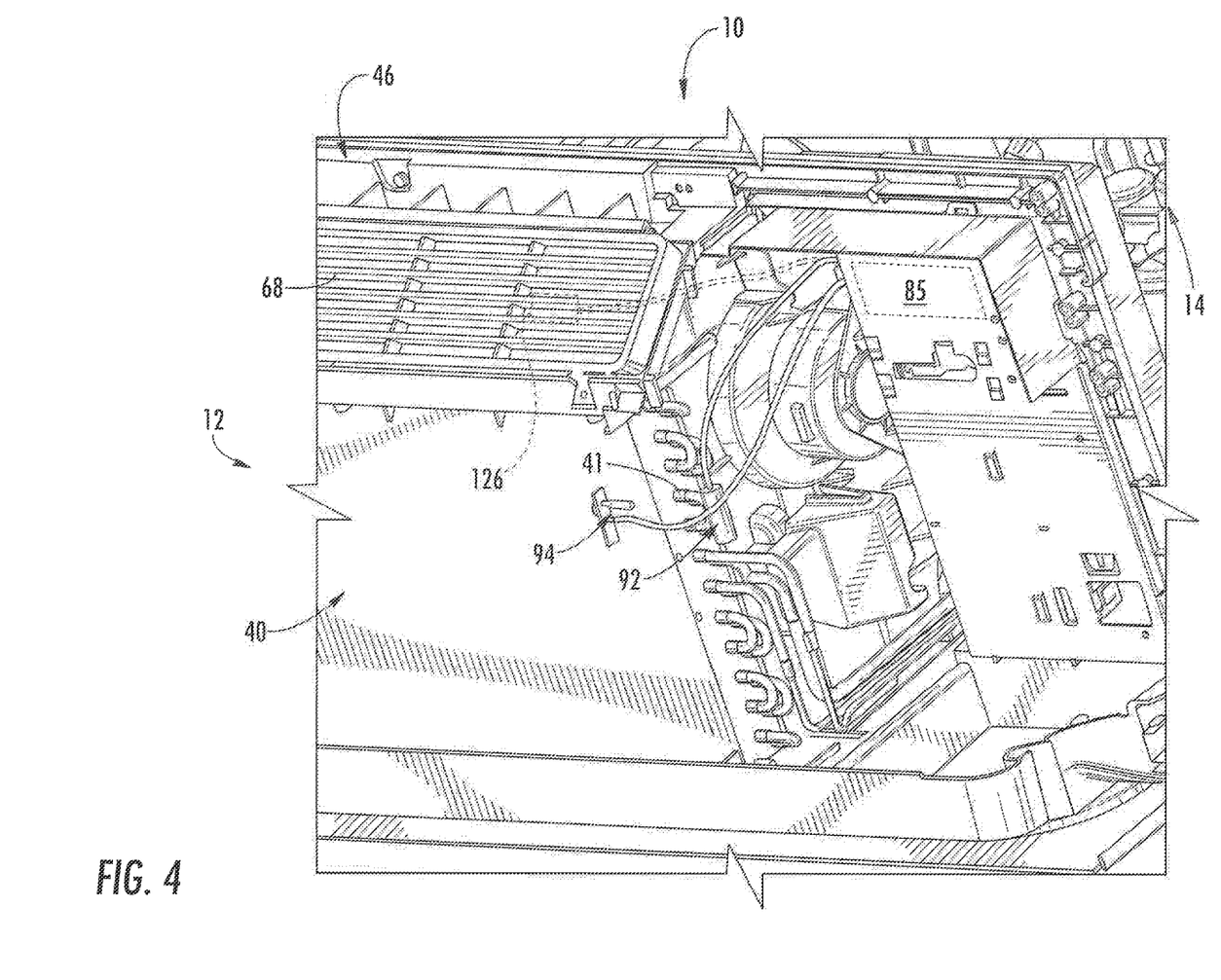
FIG. 4 is another perspective view of components of an indoor portion of an air conditioner unit in accordance with exemplary embodiments of the present disclosure.

Referring now to FIGS. 1, 4, and 5, in some embodiments, a first indoor temperature sensor 92 (e.g., indoor refrigerant temperature sensor) or a second indoor temperature sensor 94 (e.g., indoor ambient temperature sensor) is disposed within the indoor portion 12. In optional embodiments, a third indoor temperature sensor 126 (e.g., indoor outlet temperature sensor) (as indicated in phantom lines) is disposed within the indoor portion 12. In alternative embodiments, indoor portion 12 is free of any such third indoor temperature sensor 126. Each temperature sensor may be configured to sense the temperature of its surroundings. For example, each temperature sensor may be a thermistor or a thermocouple. The indoor temperature sensors 92, 94, 126 may be in communication with the controller 85, and may transmit temperatures sensed thereby to the controller 85 (e.g., as one or more voltages or signals, which the controller 85 is configured to interpret as temperature values). Optionally, the voltages or signal transmitted to the controller 85 may be transmitted in response to a polling request or signal received by one or more of the indoor temperature sensors 92, 94, 126. For example, a polling request or signal may be transmitted to one or more of the indoor temperature sensors 92, 94, 126 from the controller 85.

First indoor temperature sensor 92 may be disposed proximate to the indoor heat exchanger 40 (such as relative to the second indoor temperature sensor 94). For example, in some embodiments, first indoor temperature sensor 92 may be in contact with the indoor heat exchanger 40, such as with a coil 41 thereof. The first indoor temperature sensor 92 may be configured to detect a temperature for the indoor heat exchanger 40. Second indoor temperature sensor 94 may be spaced from the indoor heat exchanger 40, such as in the transverse direction T. For example, the second indoor temperature sensor 94 may be in contact with the room front 24, as illustrated in FIG. 1. Second indoor temperature sensor 94 may be configured to detect a temperature of air entering the indoor portion 12. Third indoor temperature sensor 126 may be spaced apart from and disposed downstream of both the first indoor temperature sensor 92 and the second indoor temperature sensor 94. For example, the third indoor temperature sensor 126 may be attached to or in contact with the air diverter 68. The third indoor temperature sensor 126 may be configured to detect a temperature for air exiting the indoor portion 12. During certain operations (e.g., in a cooling mode), air may thus generally flow across or adjacent to the second indoor temperature sensor 94, the first indoor temperature sensor 92, and then the third indoor temperature sensor 126.

Referring especially to FIGS. 1 and 5, some embodiments, such as exemplary heat pump unit embodiments, a first outdoor temperature sensor 132 (e.g., outdoor refrigerant temperature sensor) (as indicated in phantom lines) and a second outdoor temperature sensor 134 (e.g., outdoor ambient temperature sensor) (as indicated in phantom lines) are disposed within the outdoor portion 14. Each temperature sensor may be configured to sense the temperature of its surroundings. For example, each temperature sensor may be a thermistor or a thermocouple. The outdoor temperature sensors 132, 134 may be in communication with the controller 85, and may transmit temperatures sensed thereby to the controller 85 (e.g., as one or more voltage signals, which the controller 85 is configured to interpret as temperature readings).

First outdoor temperature sensor 132 may be disposed proximate to the outdoor heat exchanger 30 (such as relative to the second outdoor temperature sensor 134). For example, in some embodiments, first outdoor temperature sensor 132 may be in contact with the outdoor heat exchanger 30, such as with a coil 31 (FIG. 1) thereof. The first outdoor temperature sensor 132 may be configured to detect a temperature for the outdoor heat exchanger 30. Second outdoor temperature sensor 134 may be spaced from the outdoor heat exchanger 30, such as in the transverse direction T. For example, the second outdoor temperature sensor 134 may be in contact with the rear grill 22 (FIG. 1). The second outdoor temperature sensor 134 may be configured to detect a temperature for air entering the outdoor portion 14. During certain operations (e.g., heating operations), air may thus generally flow across or adjacent to the second outdoor temperature sensor 134 and then the first outdoor temperature sensor 132.

In optional embodiments, a secondary device 210 is provided at a location separate and apart from the cabinet 20 while still being in operable (e.g., wireless) communication with controller 85. For instance, secondary device 210 may include or be provided as a suitable remote server, computer, or personal device (e.g., tablet, smartphone, wearable, etc.). Generally, secondary device 210 includes a remote body that houses or supports a secondary controller 216. In some embodiments, a network interface 218 may be mounted within the remote body 212 (e.g., to selectively communicate with the controller 85).

In certain embodiments, the secondary controller 216 includes one or more memory devices and one or more processors. The processors of the secondary controller 216 can be any combination of general or special purpose processors, CPUs, or the like that can execute programming instructions or control code associated with operation of remote temperature sensor 210. The memory devices (i.e., memory) of the secondary controller 216 may represent random access memory such as DRAM or read only memory such as ROM or FLASH. In certain embodiments, the processor of the secondary controller 216 executes programming instructions stored in the memory of the secondary controller 216. The memory of the secondary controller 216 may be a separate component from the processor or may be included onboard within the processor. Alternatively, the secondary controller 216 may be constructed without using a processor, for example, using a combination of discrete analog or digital logic circuitry (such as switches, amplifiers, integrators, comparators, flip-flops, AND gates, and the like) to perform control functionality instead of relying upon software.

As is understood, secondary device 210 may include a secondary user interface 214. For instance, secondary user interface 214 may include one or more displays or inputs (e.g., buttons, knobs, touchscreens, etc.) to transmit information or commands between user interface 214 and secondary controller 216.

In optional embodiments, the secondary controller 216 includes a network interface 218 (e.g., on or off board secondary controller 216) such that secondary controller 216 can connect to and communicate over one or more networks (e.g., wireless communications network 220) with the controller 85. In some such embodiments, network interface 218 includes one or more transmitting, receiving, or transceiving components for transmitting/receiving communications with the controller 85 via wireless communications network 220. In exemplary embodiments, the wireless communications network 220 may be a wireless sensor network (such as a Bluetooth communication network), a wireless local area network (WLAN), a point-to point communication networks (such as radio frequency identification networks, near field communications networks, etc.), or a combination of two or more of the above communications networks.

In certain embodiments, the secondary controller 216 is configured to receive (e.g., wirelessly receive) one or more detected conditions (i.e., signals corresponding to a detected condition) from the controller 85. Such signals may correspond to a temperature measured at air conditioner 10 or a fault state indicating atypical or undesirable performance of air conditioner 10.

Figure 6:
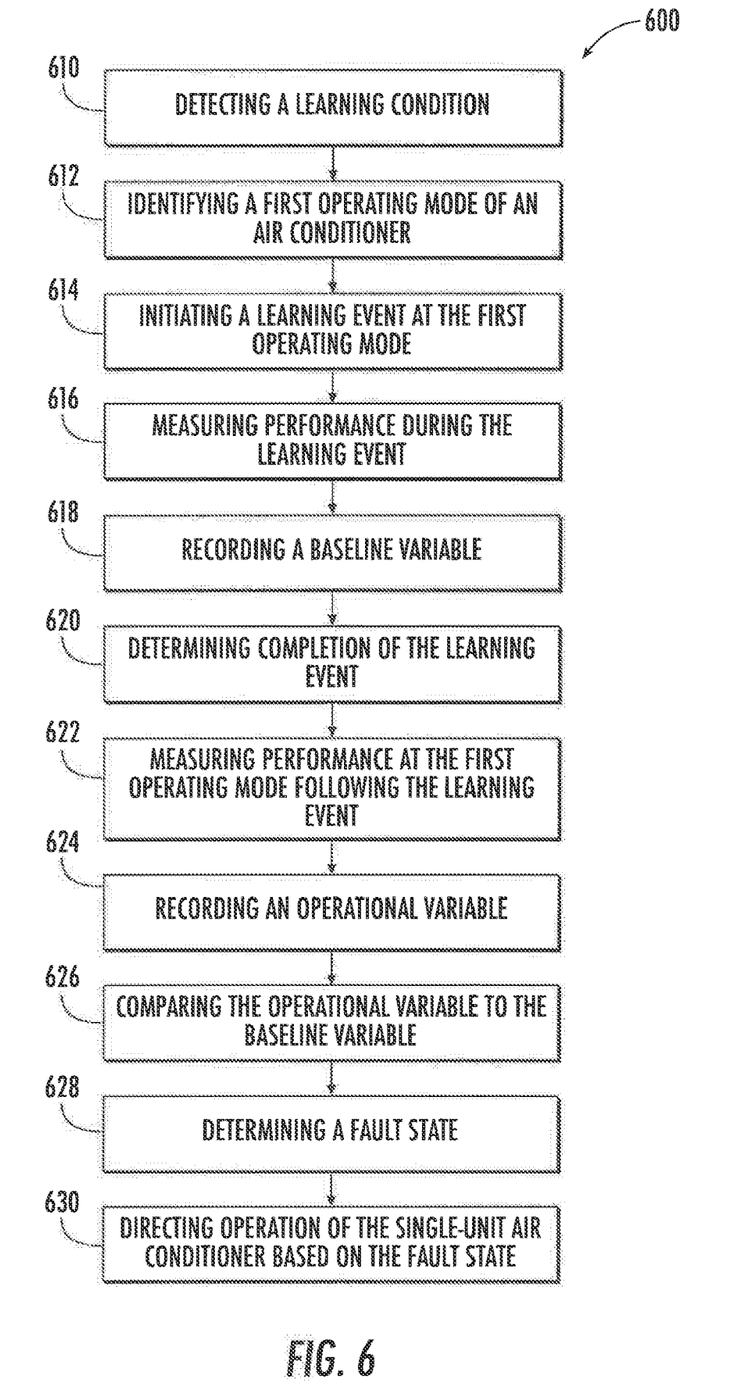
FIG. 6 provides a flow chart illustrating a method of operating an air conditioner unit according to exemplary embodiments of the present disclosure.
Figure 7:
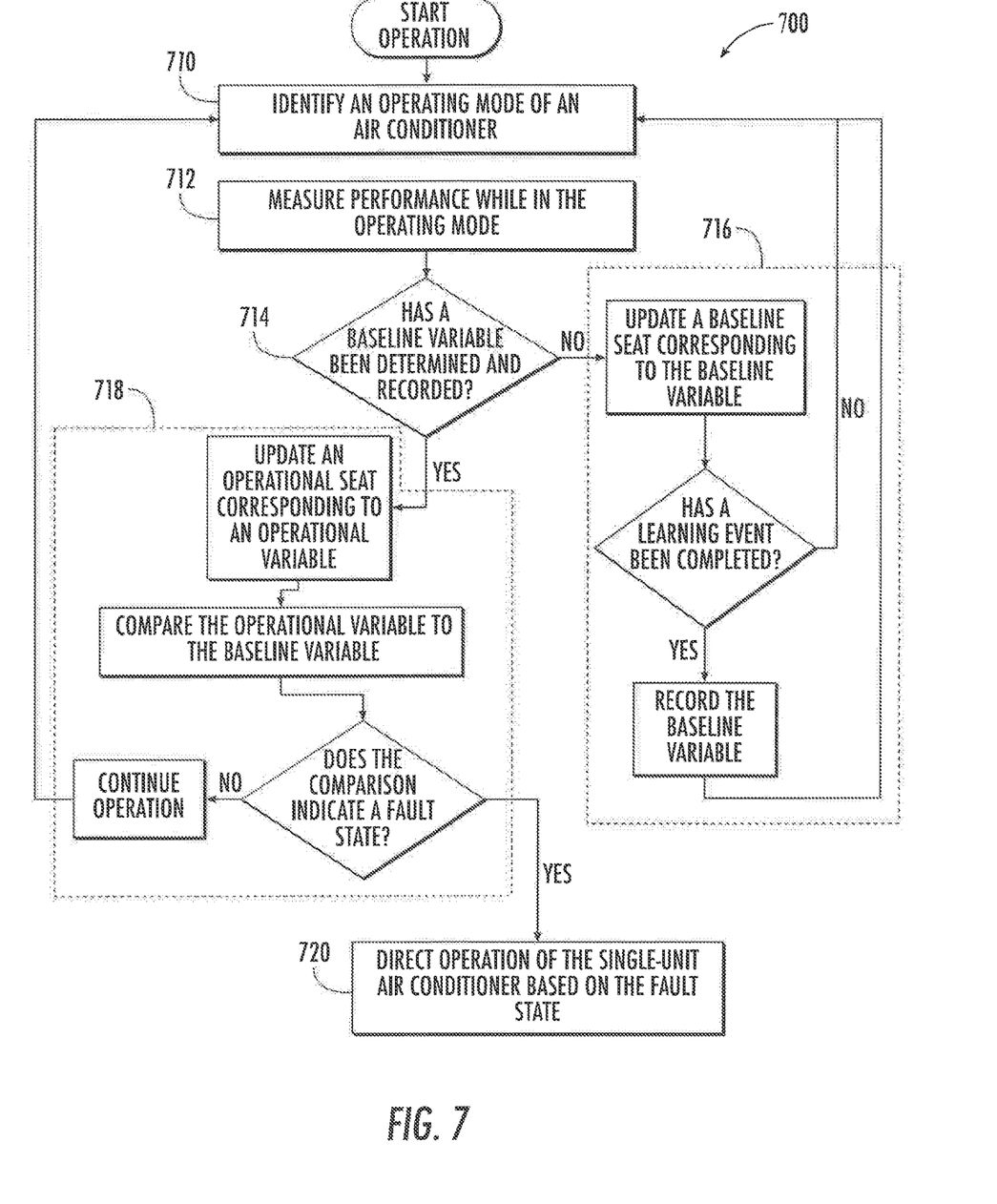
FIG. 7 provides a flow chart illustrating a method of operating an air conditioner unit according to exemplary embodiments of the present disclosure.

Referring now to FIGS. 6 and 7, the present disclosure may further be directed to methods (e.g., method 600 or 700) of operating an air conditioner or air conditioning appliance, such as air conditioner 10. In exemplary embodiments, the controller 85 may be operable to perform various steps of a method in accordance with the present disclosure.

The methods (e.g., 600 or 700) may occur as, or as part of, a conditioner operation (e.g., a cooling or heating operation) of the air conditioner 10. In particular, the methods disclosed herein may advantageously adapt detection or performance of a specific air conditioner unit according to the room, environment, or location in which the unit is installed and thus continues to operate.

It is noted that the order of steps within methods 600 and 700 are for illustrative purposes. Moreover, neither method 600 nor 700 is mutually exclusive. In other words, methods within the present disclosure may include either or both of methods 600 and 700. Both may be adopted or characterized as being fulfilled in a common operation. Except as otherwise indicated, one or more steps in the below method 600 or 700 may be changed, rearranged, performed in a different order, or otherwise modified without deviating from the scope of the present disclosure.

Turning especially to FIG. 6, at 610, the method 600 includes detecting a learning condition. The learning condition may be detected automatically (e.g., by the controller of the air conditioner without any direct input or command from a user) or, alternatively, in response to a user input or command (e.g., received by the controller from the control panel or a secondary device).

In some embodiments, the learning condition is a new installation of the single package air conditioner. As an example, the learning condition may be detected upon first receiving power or receiving an activation command when installed in a building. As another example, the learning condition may be detected based on an extended time period without power (e.g., as may be caused by disconnecting the air conditioner from a power source) prior to receiving power.

In additional or alternative embodiments, the learning condition is a new temperate season (e.g., summer, autumn, winter, or spring). As an example, the controller may include a preset calendar that tracks the days of the year and automatically indicates when a new temperate season begins. As another example, the controller may receive a signal indicating a new temperate season from a secondary device (e.g., in wireless communication with the controller).

In further additional or alternative embodiments, learning condition is a service event for the air conditioner. As an example, a user or service person may manually input a command indicating that a service event has taken place or that a learning condition is otherwise desired (e.g., to set or reset one or more baselines, as described further below). As another example, the service event may be automatically detected in response to one or more predetermined changes within the air conditioner (e.g., a measured increase in refrigerant, such as Freon, within the sealed system of the air conditioner).

At 612, the method 600 includes identifying a first operating mode. Generally, the first operating mode may represent the mode in which the air conditioner is operating (e.g., at the time of identification). Optionally, the first operating mode may be selected by a user from one or more preset operating modes. For instance, as described above, the air conditioner may include multiple distinct modes of operation, such as a cooling mode, a heating mode, a fan-only mode, or an idle mode (e.g., in which any heating or cooling components are maintained in an inactive state by the controller). Nonetheless, as would be understood, additional or alternative modes may also be provided. For instance, further embodiments may include multiple discrete heating modes, cooling modes, or fan-only modes. After the user has chosen or selected the first operating mode (e.g., at the control panel or a secondary device), the controller may identify the choice or selection. Identification may occur prior to or subsequent to 610.

At 614, the method 600 includes initiating a learning event at the first operating mode. In particular, at least one learning event may be initiated in response to detecting the learning condition at 610. In some embodiments, 614 further follows 612. Generally, the learning event may represent a time or period of operation under a given mode (e.g., first operating mode) of the air conditioner that can serve as a standard or reference for evaluating later performance.

In some embodiments, the learning event includes or is measured as a predetermined span of time (e.g., as measured in minutes). The predetermined span of time may be measured or begin upon initiation of the learning event such that the learning event ends upon expiration of the predetermined span of time following the moment 614 begins. The predetermined span of time may be required to be uninterrupted (e.g., a continuous span of time in which the air conditioner in the first operating mode) or, alternatively, may be permitted to be cumulative (e.g., a total span of time in which the air conditioner is in the first operating mode both before and after the air conditioner has been placed in a discrete second operating mode).

In other embodiments, the learning event includes or is measured as a predetermined number of active cycles. As is understood, each active cycle may be a discrete cycle in which a component of the air conditioner (e.g., the compressor or heater bank) has been activated in order to adjust the indoor temperature within the corresponding room to a set or selected temperature. For instance, one active cycle may be demarcated as a cooling cycle in which a temperature above the set temperature (or hysteresis thereof) is measured, the compressor is activated (e.g., at a first compressor speed to motivate refrigerate through the sealed system) to reduce heat within the corresponding room, a new temperature at or below the set temperature (or hysteresis thereof) is measured, and the compressor is deactivated (e.g., stops or slows the flow rate of refrigerant through the sealed system). Additionally or alternatively, one active cycle may be demarcated as a heating cycle in which a temperature below the set temperature (or hysteresis thereof) is measured, the heater bank or compressor is activated (e.g., at a first compressor speed to motivate refrigerate through the sealed system) to generate heat within the corresponding room, a new temperature at or above the set temperature (or hysteresis thereof) is measured, and the heater bank or compressor is deactivated (e.g., stops or slows the flow rate of refrigerant through the sealed system).

At 616, the method 600 includes measuring performance of the air conditioner during the learning event of the first operating mode. For instance, performance during the learning event may be measured according to one or more signals or voltages detected within the air conditioner (e.g., from temperature sensor(s), compressor, heater bank, etc.).

In some embodiments, performance is measured according to a temperature rate of change (e.g., as a time taken to change a set number of degrees or as a change in temperature over time or $\Delta T$/minute). For instance, performance may be measured as an indoor temperature rate of change. The measurement of temperature rate of change may be calculated over a set measurement period (e.g., the entirety or mere sub portion of the learning event) or, alternatively, over a set temperature range (e.g., total amount of temperature change within the indoor portion of the air conditioner). During the learning event, multiple temperature signals may thus be received from one or more of the indoor temperature sensors, as described above, and used to calculate the indoor temperature rate of change.

In additional or alternative embodiments, performance is measured according to energy use (e.g., as measured in kilowatt hours) of or within the air conditioner. For instance, the amount of energy used at the compressor or heater bank may be measured by the controller of the air conditioner, as is understood. The measurement of energy use may be calculated over a set measurement period (e.g., the entirety or mere sub portion of the learning event) or, alternatively, over a set temperature range (e.g., total amount of temperature change within the indoor portion of the air conditioner).

In further additional or alternative embodiments, performance is measured according to active runtime of or within the air conditioner. For instance, the span of time in which the compressor or heater bank is active (e.g., actively operating to cool or heat the corresponding room) may be measured. The measurement of active runtime may be calculated over a set measurement period (e.g., the entirety or mere sub portion of the learning event) or, alternatively, over a set temperature range (e.g., total amount of temperature change within the indoor portion of the air conditioner).

At 618, the method 600 includes recording, within the air conditioner, a baseline variable of the first operating mode based on the measured performance during the learning event. In other words, the air conditioner may temporarily or permanently record (e.g., at the controller or a secondary device) a baseline variable that is based on or drawn from the measurement of 616. The baseline variable may thus include or be provided as a value of temperature rate of change, energy use, active runtime, etc. As an example, the baseline variable may include or be provided as a single value of measured performance at 616. As another example, the baseline variable may include or be provided as an average (i.e., mean) value of multiple values of measured performance (e.g., at 616).

In the case of a fan-only or an idle mode, the baseline variable may provide a suitable indication of off room performance and, specifically, heat loss or gain. Heat loss or gain may, for example, provide an indication of the heating or cooling needs of a room (e.g., in order to determine the appropriate unit size or capacity).

At 620, the method 600 includes determining completion of the learning event. In other words, 620 includes determining that (or when) the learning event has ended following 614. If the learning event includes a predetermined span of time, 620 may include detecting the predetermined span of time has ended or otherwise been fulfilled (e.g., while the air conditioner was in the first mode). If the learning event includes predetermined number of active cycles, 620 may include detecting that the air conditioner is performed at least the predetermined number of active cycles (e.g., while the air conditioner was in the first mode).

At 622, the method 600 includes measuring performance of the air conditioner at the first operating mode following the learning event (i.e., subsequent to 616 or 620). Optionally, 622 may begin immediately after 620. For instance, 622 may be prompted by or in response to determining completion of the learning event. Performance at 622 may be measured according to one or more signals or voltages detected within the air conditioner (e.g., from temperature sensor(s), compressor, heater bank, etc.). In some embodiments, performance at 622 is measured similarly to (e.g., as the type of measurement of) the measurement at 616. Thus, 622 may include measuring temperature rate of change, energy use, active runtime, etc. within the air conditioner.

At 624, the method 600 includes recording, within the air conditioner, an operational variable of the first operating mode based on the measured performance at the first mode following the learning event. In other words, the air conditioner may temporarily or permanently record (e.g., at the controller or a secondary device) an operational variable that is based on or drawn from the measurement of 622. The operational variable may thus include or be provided as a value of temperature rate of change, energy use, active runtime, etc. As an example, the operational variable may include or be provided as a single value of measured performance at 616. As another example, the operational variable may include or be provided as a cumulative value of multiple measurements. For instance, as individual measurement values for an operational variable are accumulated over time, they may be incorporated into one or more cumulative values, such as a running average (i.e., mean) or running standard deviation of multiple measured values (i.e., multiple measured measurement values of the same type, such as rate of temperature change, energy use, active runtime, etc.). Optionally, a running average and running standard deviation of measured values for the operational variable may be incorporated into a control chart (i.e., Shewhart chart), as would be understood in light of the present disclosure. Over time, the operational variable may be provided as or included with the running average, running standard deviation, or control chart.

At 626, the method 600 includes comparing the operational variable of the first operating mode to the baseline variable of the first operating mode. In other words, the baseline variable of 618 may be compared to the operational variable of 624. In some embodiments, a direct comparison is made between the baseline variable (e.g., a single value or average value of the baseline variable) and the operational variable (e.g., a single value or running average value of the operational variable). A variation between the two values may further be determined (e.g., as a percentage).

In additional or alternative embodiments (e.g., separate from or in addition to comparing the operational variable to the baseline variable), the operational variable may be compared to a set limit (e.g., programmed within the controller or secondary device). The set limit may represent an absolute value or range of values for the operational variable, irrespective of environmental or unit-to-unit variations.

In further additional or alternative embodiments (e.g., separate from or in addition to comparing the operational variable to the baseline variable), the operational variable may be compared to a control chart generated from previously measured values of performance at the first operating mode. For instance, the value of the operational variable may be compared to the upper and lower control limits (e.g., the natural process limits within three standard deviations from the mean value of the control chart statistic).

At 628, the method 600 includes determining a fault state. Generally, the fault state may be understood to represent undesirable or atypical performance of air conditioner determined without requiring direct input, measurement, or calculation from a user. In particular, the determination of the fault state may be based, at least in part, on the comparison at 626 between the baseline variable and the operational variable. In some embodiments, the fault state is determined in response to determining a variation between the baseline variable and the operational variable exceeds a set maximum variation (e.g., percentage). Thus, the fault state may be determined when the operational variable differs from the baseline variable by more than the set maximum variation. In additional or alternative embodiments, the fault state is determined in response to determining the operational variable exceeds the set limit (e.g., irrespective of the variation between the baseline variable). In further additional or alternative embodiments, the fault state is determined in response to determining the operational variable falls outside of the upper and lower control limits of the control chart. In other words, the operational variable is either greater than the upper control limit or less than the lower control limit.

At 630, the method 600 includes directing operation of the air conditioner based on the fault state. In particular, the fault state may be recorded, for instance, within the air conditioner or a secondary device. Additionally or alternatively, an alert, such as a visual or audio message indicating that the fault state has occurred, may be initiated (e.g., at the control panel of the air conditioner or a secondary device). Optionally, a running tally of all determined fault states may be maintained such that a count of total fault states is recorded. In some embodiments, the air conditioner can restrict certain modes or components (e.g., compressor or heater bank) from being engaged in response to the fault state. Thus, such modes or components may be prevented from operating within the air conditioner (or otherwise be significantly restricted). In other embodiments, the air conditioner can require a preset number of total fault states to be recorded before such modes or components are restricted.

Although described above with respect to a single, first operating mode, it is understood that the method 600 may include repeating certain steps (e.g., 612, 614, 616, 618, 620, 622, 624, 626, 628, or 630) for multiple operating modes in the context of a single learning condition. Thus, 600 may include multiple learning events and baseline variables corresponding to different operating modes. For example, 600 may further include identifying a second operating mode of the air conditioner; initiating a learning event at the second operating mode following the first operating mode (e.g., subsequent to 614 or 616); measuring performance (e.g., temperature rate of change, energy use, active runtime, etc.) during the learning event of the second operating mode; recording a baseline variable of the second operating mode based on the measured performance during the learning event of the second operating mode; measuring performance of the air conditioner at the second operating mode following the learning event of the second operating mode; recording an operational variable of the second operating mode based on the measured performance at the second operating mode; comparing the operational variable of the second operating mode to the baseline variable of the second operating mode; determining a second fault state based on comparing the operational variable of the second operating mode to the baseline variable of the second operating mode; or recording the second fault state.

Additionally or alternatively, in addition to evaluating performance for an operational mode, performance may be evaluated in the context of an environmental condition, such as humidity, light intensity, time of day, date, temperate season, or a temperature variation between an outdoor temperature (e.g., measured at one or more of the outdoor temperature sensors) and indoor temperature (e.g., measured at one or more of the indoor temperature sensors). Thus, it is understood that the method 600 may include repeating certain steps (e.g., 612, 614, 616, 618, 620, 622, 624, 626, 628, or 630) for multiple variations in an environmental condition while the air conditioner is in the same (e.g., first) operating mode. Optionally, multiple predetermined states may be provided for a corresponding environmental condition. As an example, in the context of temperature variation, a separate temperature variation state may be provided for a temperature variation between −30 to 10° Celsius, −20 to −10° Celsius, −10 to 0° Celsius, 0 to 10° Celsius, 10 to 20° Celsius, and 30 to 40° Celsius.

As an illustrative example, 600 may further include detecting a first temperature variation between indoor temperature and outdoor temperature prior to initiating the learning event at 610; detecting a second temperature variation between indoor temperature and outdoor temperature following the first learning event (e.g., subsequent to 614 or 616); identifying the first operating mode of the single-package air conditioner following the second temperature variation; initiating a second learning event at the first operating mode and the second temperature variation; measuring performance (e.g., temperature rate of change, energy use, active runtime, etc.) of the air conditioner during the second learning event of the first operating mode; recording a second baseline variable of the first operating mode based on the measured performance during the second learning event; measuring performance of the air conditioner at the first operating mode and the second temperature variation following the second learning event; recording a second operational variable of the first operating mode based on the measured performance at the first operating mode and the second temperature variation; comparing the second operational variable of the first operating mode to the second baseline variable of the first operating mode; determining a second fault state based on comparing the second operational variable of the first operating mode to the second baseline variable of the second operating mode; or recording the second fault state.

Turning now to FIG. 7, at 710, the method 700 includes identifying an operating mode of the air conditioner. Generally, the operating mode may represent the mode in which the air conditioner is operating (e.g., at the time of identification). Optionally, the operating mode may be selected by a user from one or more preset operating modes. For instance, as described above, the air conditioner may include multiple distinct modes of operation, such as a cooling mode, a heating mode, a fan-only mode, or an idle mode (e.g., in which any heating or cooling components are maintained in an inactive state by controller). Nonetheless, as would be understood, additional or alternative modes may also be provided. For instance, further embodiments may include multiple discrete heating modes, cooling modes, or fan-only modes. After the user has chosen or selected the operating mode (e.g., at the control panel or a secondary device), the controller may identify the choice or selection.

At 712, the method 700 includes measuring performance while in the operating mode of 710. For instance, performance during the operating mode may be measured according to one or more signals or voltages detected within the air conditioner (e.g., from temperature sensor(s), compressor, heater bank, etc.).

In some embodiments, performance is measured according to a temperature rate of change (e.g., as a time taken to change a set number of degrees or as a change in temperature over time or $\Delta T/minute$). For instance, performance may be measured as an indoor temperature rate of change. The measurement of temperature rate of change may be calculated over a set measurement period (e.g., the entirety or mere sub portion of the learning event) or, alternatively, over a set temperature range (e.g., total amount of temperature change within the indoor portion of the air conditioner). During the learning event multiple temperature signals may thus be received from one or more of the indoor temperature sensors, as described above, and used to calculate the indoor temperature rate of change.

In additional or alternative embodiments, performance is measured according to energy use (e.g., as measured in kilowatt hours) of or within the air conditioner. For instance, the amount of energy used at the compressor or heater bank may be measured by the controller of the air conditioner, as is understood. The measurement of energy use may be calculated over a set measurement period (e.g., the entirety or mere sub portion of the learning event) or, alternatively, over a set temperature range (e.g., total amount of temperature change within the indoor portion of the air conditioner).

In further additional or alternative embodiments, performance is measured according to active runtime of or within the air conditioner. For instance, the span of time in which the compressor or heater bank is active (e.g., actively operating to cool or heat the corresponding room) may be measured. The measurement of active runtime may be calculated over a set measurement period (e.g., the entirety or mere sub portion of the learning event) or, alternatively, over a set temperature range (e.g., total amount of temperature change within the indoor portion of the air conditioner).

At 714, the method 700 includes reviewing a baseline variable and advancing the method 700 to 716 or 718 accordingly. In other words, following 712, the method may proceed to 716 or 718 depending on whether a baseline variable has been previously determined and recorded for the operating mode (e.g., with or without accounting to one or more environmental conditions). If the baseline variable has not been determined and recorded, the method 700 may proceed to 716. If the baseline variable has been determined and recorded, the method 700 may proceed to 718.

At 716, the method 700 includes establishing the baseline variable. In particular, the measured performance (e.g., value thereof) of 712 may be used to update a baseline seat (e.g., temporarily-stored cell within the controller of the air conditioner or secondary device). As an example, the measured performance of 712 may be directly inserted into the baseline seat. As another example, the measured performance of 712 may be used to update an average (i.e., mean) value.

Once the baseline seat has been updated, 716 may further include determining if a learning event has been completed for determining the baseline variable. As described above, the learning event may represent a time or period of operation under a given mode of the air conditioner that can serve as a standard or reference for evaluating later performance. In some embodiments, the learning event includes or is measured as a predetermined span of time (e.g., as measured in minutes). The predetermined span of time may be required to be uninterrupted (e.g., a continuous span of time in which the air conditioner in the first operating mode) or, alternatively, may be permitted to be cumulative (e.g., a total span of time in which the air conditioner is in the first operating mode both before and after the air conditioner has been placed in a discrete second operating mode). In other embodiments, the learning event includes or is measured as a predetermined number of active cycles. As is understood, each active cycle may be a discrete cycle in which a component of the air conditioner (e.g., the compressor or heater bank) has been activated in order to adjust the indoor temperature within the corresponding room to a set or selected temperature.

If it is determined that the learning event has not been completed, the method 700 may return directly to, for example, 710 from 716. If it is determined that the learning event has been completed, the method 700 may first record the baseline variable (e.g., from the baseline seat) before returning to 710 from 716.

Returning to 718, following 714 when the baseline variable has been determined and recorded, the method 700 includes evaluating an operational variable. In particular, the measured performance (e.g., value thereof) of 712 may be used to update an operational seat (e.g., temporarily-stored cell within the controller of the air conditioner or secondary device). As an example, the measured performance of 712 may be directly inserted into the operational seat. As another example, the measured performance of 712 may be used to update a running average (i.e., mean) value. Also additionally or alternatively, a running standard deviation or control chart may be updated.

Once the operational seat has been updated, 718 may further include comparing the operational variable (e.g., as provided at the operational variable seat) to the baseline variable. In some embodiments, a direct comparison is made between the baseline variable (e.g., a single value or average value of the baseline variable) and the operational variable (e.g., a single value or running average value of the operational variable). A variation between the two values may further be determined (e.g., as a percentage).

The comparison may or may not indicate a fault state. Generally, the fault state may be understood to represent undesirable or atypical performance of air conditioner determined without requiring direct input, measurement, or calculation from a user. In some embodiments, a variation between the baseline variable and the operational variable exceeding a set maximum variation (e.g., percentage) indicates a fault state. Thus, the fault state may be determined when the operational variable differs from the baseline variable by more than the set maximum variation. Optionally, further evaluations may be made, such as comparing the operational variable to a set limit or determining if the operational variable falls outside of the upper and lower control limits of the control chart, as described above.

If the fault state is not indicated (e.g., by the comparison), the air conditioner may continue operating (e.g., in the same operating mode) and the method 700 may return to 710. If a fault state is indicated, the method 700 may proceed to 720.

At 720, the method 700 includes directing operation of the air conditioner based on the fault state. Optionally, the fault state may be recorded, for instance, within the air conditioner or a secondary device. Additionally or alternatively, an alert, such as a visual or audio message indicating that the fault state has occurred, may be initiated (e.g., at the control panel of the air conditioner or a secondary device). Optionally, a running tally of all determined fault states may be maintained such that a count of total fault states is recorded. In some embodiments, the air conditioner can restrict certain modes or components (e.g., compressor or heater bank) from being engaged in response to the fault state. Thus, such modes or components may be prevented from operating within the air conditioner (or otherwise be significantly restricted). In other embodiments, the air conditioner can require a preset number of total fault states to be recorded before such modes or components are restricted.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating an air conditioner, the method comprising:
   detecting a learning condition at the air conditioner;
   identifying a first operating mode of the air conditioner;
   initiating a learning event at the first operating mode in response to detecting the learning condition;
   measuring performance of the air conditioner during the learning event of the first operating mode;
   recording, within the air conditioner, a baseline variable of the first operating mode based on the measured performance during the learning event;
   measuring performance of the air conditioner at the first operating mode following the learning event;
   recording, within the air conditioner, an operational variable of the first operating mode based on the measured performance at the first operating mode following the learning event;
   comparing the operational variable of the first operating mode to the baseline variable of the first operating mode;
   determining a fault state based on comparing the operational variable of the first operating mode to the baseline variable of the second operating mode; and
   recording, within the air conditioner, the fault state.

2. The method of claim 1, wherein the learning condition is a new installation of the of the air conditioner.

3. The method of claim 1, wherein the learning condition is a new temperate season.

4. The method of claim 1, wherein the learning condition is a service event for the air conditioner.

5. The method of claim 1, wherein the learning event comprises a predetermined span of time.

6. The method of claim 1, wherein the learning event comprises a predetermined number of active cycles.

7. The method of claim 1, further comprising comparing the operational variable of the first operating mode to a preset limit of the first operating mode, wherein determining the fault state is further based on comparing the operational variable of the first operating mode to the preset limit.

8. The method of claim 1, wherein the fault state is a first fault state, and further comprising:
   identifying a second operating mode of the air conditioner;
   initiating a learning event at the second operating mode following the first operating mode;
   measuring performance of the air conditioner during the learning event of the second operating mode;
   recording, within the air conditioner, a baseline variable of the second operating mode based on the measured performance during the learning event of the second operating mode;
   measuring performance of the air conditioner at the second operating mode following the learning event of the second operating mode;
   recording, within the air conditioner, an operational variable of the second operating mode based on the measured performance at the second operating mode;
   comparing the operational variable of the second operating mode to the baseline variable of the second operating mode;
   determining a second fault state based on comparing the operational variable of the second operating mode to the baseline variable of the second operating mode; and
   recording, within the air conditioner, the second fault state.

9. The method of claim 1, wherein the learning event is a first learning event, wherein the baseline variable is a first baseline variable, wherein the operational variable is a second operational variable, wherein the fault state is a first fault state, and further comprising:
   detecting a first temperature variation between indoor temperature and outdoor temperature prior to initiating the first learning event;
   detecting a second temperature variation between indoor temperature and outdoor temperature following the first learning event;
   identifying the first operating mode of the air conditioner following the second temperature variation;
   initiating a second learning event at the first operating mode and the second temperature variation;
   measuring performance of the air conditioner during the second learning event of the first operating mode;
   recording, within the air conditioner, a second baseline variable of the first operating mode based on the measured performance during the second learning event;
   measuring performance of the air conditioner at the first operating mode and the second temperature variation following the second learning event;
   recording, within the air conditioner, a second operational variable of the first operating mode based on the measured performance at the first operating mode and the second temperature variation;
   comparing the second operational variable of the first operating mode to the second baseline variable of the first operating mode;
   determining a second fault state based on comparing the second operational variable of the first operating mode to the second baseline variable of the second operating mode; and
   recording, within the air conditioner, the second fault state.

10. An air conditioner defining a mutually-perpendicular vertical direction, lateral direction, and transverse direction, the air conditioner comprising:
    a cabinet defining an outdoor portion and an indoor portion;
    an outdoor heat exchanger disposed in the outdoor portion;
    an indoor heat exchanger disposed in the indoor portion;
    a compressor in fluid communication with the outdoor heat exchanger and the indoor heat exchanger to circulate a refrigerant between the outdoor heat exchanger and the indoor heat exchanger;
    a controller in operative communication with the compressor; and
    an internal temperature sensor in operative communication with the controller, the controller being configured to initiate a conditioning operation, the conditioning operation comprising
       detecting a learning condition at the air conditioner,
       identifying a first operating mode of the air conditioner,
       initiating a learning event at the first operating mode in response to detecting the learning condition,
       measuring performance of the air conditioner during the learning event of the first operating mode, recording, within the air conditioner, a baseline variable of the first operating mode based on the measured performance during the learning event, measuring performance of the air conditioner at the first operating mode following the learning event, recording, within the air conditioner, an operational variable of the first operating mode based on the measured performance at the first operating mode following the learning event, comparing the operational variable of the first operating mode to the baseline variable of the first operating mode, determining a fault state based on comparing the operational variable of the first operating mode to the baseline variable of the second operating mode, and recording, within the air conditioner, the fault state.

11. The air conditioner of claim 10, wherein the learning condition is a new installation of the of the air conditioner.

12. The air conditioner of claim 10, wherein the learning condition is a new temperate season.

13. The conditioner of claim 10, wherein the learning condition is a service event for the air conditioner.

14. The conditioner of claim 10, wherein the learning event comprises a predetermined span of time.

15. The air conditioner of claim 10, wherein the learning event comprises a predetermined number of active cycles.

16. The air conditioner of claim 10, wherein the conditioning operation further comprises comparing the operational variable of the first operating mode to a preset limit of the first operating mode, wherein determining the fault state is further based on comparing the operational variable of the first operating mode to the preset limit.

17. The air conditioner of claim 10, wherein the fault state is a first fault state, and wherein the conditioning operation further comprises
- identifying a second operating mode of the air conditioner,
- initiating a learning event at the second operating mode following the first operating mode,
- measuring performance of the air conditioner during the learning event of the second operating mode,
- recording, within the air conditioner, a baseline variable of the second operating mode based on the measured performance during the learning event of the second operating mode,
- measuring performance of the air conditioner at the second operating mode following the learning event of the second operating mode,
- recording, within the air conditioner, an operational variable of the second operating mode based on the measured performance at the second operating mode,
- comparing the operational variable of the second operating mode to the baseline variable of the second operating mode,
- determining a second fault state based on comparing the operational variable of the second operating mode to the baseline variable of the second operating mode, and
- recording, within the air conditioner, the second fault state.

18. The air conditioner of claim 10, wherein the learning event is a first learning event, wherein the baseline variable is a first baseline variable, wherein the operational variable is a second operational variable, wherein the fault state is a first fault state, and wherein the conditioning operation further comprises
- detecting a first temperature variation between indoor temperature and outdoor temperature prior to initiating the first learning event,
- detecting a second temperature variation between indoor temperature and outdoor temperature following the first learning event,
- identifying the first operating mode of the air conditioner following the second temperature variation,
- initiating a second learning event at the first operating mode and the second temperature variation,
- measuring performance of the air conditioner during the second learning event of the first operating mode,
- recording, within the air conditioner, a second baseline variable of the first operating mode based on the measured performance during the second learning event,
- measuring performance of the air conditioner at the first operating mode and the second temperature variation following the second learning event,
- recording, within the air conditioner, a second operational variable of the first operating mode based on the measured performance at the first operating mode and the second temperature variation,
- comparing the second operational variable of the first operating mode to the second baseline variable of the first operating mode,
- determining a second fault state based on comparing the second operational variable of the first operating mode to the second baseline variable of the second operating mode, and
- recording, within the air conditioner, the second fault state.

* * * * *